(12) United States Patent
Choi et al.

(10) Patent No.: US 11,036,034 B2
(45) Date of Patent: Jun. 15, 2021

(54) TELEPHOTO LENS SYSTEM

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Seung Nam Nam, Gyeonggi-do (KR); Sung Nyun Kim, Incheon (KR)

(73) Assignee: SEKONIX CO., LTD.

( * ) Notice: Subject to any disclaimer, the term of this patent is extended or adjusted under 35 U.S.C. 154(b) by 133 days.

(21) Appl. No.: 16/576,047

(22) Filed: Sep. 19, 2019

(65) Prior Publication Data
US 2020/0319432 A1 Oct. 8, 2020

(30) Foreign Application Priority Data
Apr. 2, 2019 (KR) .................. 10-2019-0038555

(51) Int. Cl.
| | | |
|---|---|---|
| *G02B 13/02* | (2006.01) | |
| *G02B 13/00* | (2006.01) | |
| *G02B 5/08* | (2006.01) | |
| *G02B 1/04* | (2006.01) | |
| *G02B 9/60* | (2006.01) | |

(52) U.S. Cl.
CPC ............. *G02B 13/02* (2013.01); *G02B 1/041* (2013.01); *G02B 5/08* (2013.01); *G02B 9/60* (2013.01); *G02B 13/0045* (2013.01); *G02B 13/0055* (2013.01)

(58) Field of Classification Search
CPC .... G02B 13/02; G02B 13/0045; G02B 1/041; G02B 9/60; G02B 13/0055; G02B 13/0065
See application file for complete search history.

(56) References Cited
U.S. PATENT DOCUMENTS
2004/0169764 A1\* 9/2004 Ishii .................... G02B 13/0045
348/340

\* cited by examiner

*Primary Examiner* — Wen Huang
(74) *Attorney, Agent, or Firm* — Mendelsohn Dunleavy, P.C.

(57) ABSTRACT

A telephoto lens system having a plurality of lenses toward a focal object is proposed. The system includes a first lens with a positive refractive power, a second lens with a negative refractive power, a third lens with a negative refractive power, a fourth lens with a negative refractive power, and a fifth lens with a positive refractive power. A refractor bending an optical axis is provided between the second lens and the third lens. The angle (A) between the optical axes of the second lens and the third lens satisfies $80° \leq A \leq 86°$. A barrel surrounding the first lens is provided by protruding more toward the focal object than the first lens. The inner diameter of the barrel is smaller than or equal to the effective diameter of the first lens, and a stop is arranged toward the focal object of the first lens.

14 Claims, 14 Drawing Sheets

PRIOR ART

TELEPHOTO LENS SYSTEM

CROSS REFERENCE TO RELATED APPLICATION

The present application claims priority to Korean Patent Application No. 10-2019-0038555, filed Apr. 2, 2019, the entire contents of which is incorporated herein for all purposes by this reference.

BACKGROUND OF THE INVENTION

Field of the Invention

The present invention relates generally to a telephoto lens system. More particularly, the present invention relates to a telephoto lens system, which has a long effective focal length and includes a reflector between a second lens and a third lens to form a structure for bending an optical axis, thereby minimizing the height of the entire lens system.

Description of the Related Art

Generally, a telephoto lens allows a person to magnify and view an object at a far distance, and to magnify and photograph the focal object at a viewing angle narrower than a normal viewing angle.

Since the telephoto lens has a long focal length, a length from a vertex of a front surface of a lens to an image surface (total track length of a lens, TTL) is also long. This length limitation makes the telephoto lens challenging to mount in a thin device such as a smartphone.

In particular, a lens with a focal length of 10 mm or more cannot be mounted because the length of the lens is about 10 mm in proportion to the focal length, which is much thicker than the thickness of a smartphone.

In order to solve this problem, the related art has introduced a structure in which a reflector is added in front of the lens to bend the optical axis and mounted on the smartphone as shown in FIG. 1.

In this case, depth is increased due to the length of a prism, which is the reflector, so that F-number is increased to reduce the lens aperture or to cut off an upper portion and a lower portion of the effective diameter of the lens as shown in FIG. 2.

However, when cutting off the upper and lower portions, there is a problem in that the resolution should be reduced by diffraction, as shown in FIG. 3.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a telephoto lens system having a long effective focal length and having a structure formed by a refractor provided between a second and a third lens so as to bend an optical axis, thus minimizing the height of the entire lens system.

In order to achieve the above objective, according to one aspect of the present invention, there is provided a telephoto lens system having a plurality of lenses arranged from a focal object side, the telephoto lens system including: a first lens having a positive refractive power; a second lens having a negative refractive power; a third lens having a negative refractive power; a fourth lens having a negative refractive power; and a fifth lens having a positive refractive power, wherein a refractor bending an optical axis is provided between the second lens and the third lens where symbol A indicates an angle between the optical axis of the second lens and the optical axis of the third lens satisfying $80°≤A≤86°$, wherein a barrel surrounding the first lens is formed by protruding more toward the focal object side than the first lens, wherein the inner diameter is smaller than or equal to the effective diameter of the lens, and wherein a stop is arranged toward the focal object of the first lens.

In addition, the first lens may be convex toward the focal object side, the second lens may be convex toward the focal object side and concave toward an image side, and the refractive power of the third lens may satisfy $-0.1<P3<0.1$.

In addition, the effective focal length f of the telephoto lens system may satisfy $11≤f≤15$, the composite focal length f12 of the first lens and the second lens may satisfy $f12>5$, and the composite focal length f345 of the third lens, the fourth lens, and the fifth lens may satisfy $f345<-5$, and $0.5<|f12/f345|<1.5$.

In addition, the Abbe number V1 of the first lens may be $50<V1<60$, and the Abbe number V2 of the second lens may be $15<V2<30$.

In addition, the second lens, the third lens, the fourth lens, and the fifth lens may be formed of a plastic material and may be aspherical lenses.

In addition, at least one of the third lens, the fourth lens, and the fifth lens may have a different Abbe number.

In addition, the effective diameter of the first lens may be formed in a circle.

In addition, in order to achieve the above objective, according to another aspect of the present invention, there is provided a telephoto lens system mounted on a smart phone and having a plurality of lenses arranged toward the focal object side, the telephoto lens system including: the first lens having the positive refractive power, the second lens having the negative refractive power, the third lens having the negative refractive power, and the fourth lens having the negative refractive power and the fifth lens having the positive refractive power, wherein the first lens is convex toward the focal object side, and the second lens is convex toward the focal object side and concave toward the image side, the reflector for bending the optical axis is provided between the second lens and the third lens, the angle A between the optical axis of the second lens and the optical axis of the third lens satisfies $80°≤A≤86°$, and the barrel surrounding the first lens is protruding toward the focal object side than the first lens, wherein the inner diameter is equal to or smaller than the effective diameter of the first lens.

Here, the refractive power P3 of the third lens may satisfy $-0.1<P3<0.1$.

In addition, the effective focal length f of the telephoto lens system may satisfy $11≤f≤15$, and the composite focal length f12 of the first lens and the second lens and the composite focal length f345 of the third, fourth, and fifth lenses may satisfy $f12>5$, $f345<-5$, and $0.5<|f12/f345|<1.5$.

In addition, the Abbe number V1 of the first lens may be $50<V1<60$, and the Abbe number V2 of the second lens may be $15<V2<30$.

In addition, the second lens, the third lens, the fourth lens, and the fifth lens may be formed of a plastic material and may be aspherical lenses.

In addition, at least one of the third lens, the fourth lens, and the fifth lens may have a different Abbe number.

In addition, the effective diameter of the first lens may be formed in a circle.

The present invention relates to a telephoto lens system having a total of five lenses, wherein each lens is evenly distributed positive and negative refractive power. The telephoto lens system realizes smallness, lightness, and correction of distortion, and the effective focal length of the total lens system is 11 mm or more. Also, by providing a reflector between the second lens and the third lens to form a structure to bend the optical axis, there is an effect that can be effectively applied to a small camera module, in particular, a smartphone by minimizing the height of the entire lens system.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The present invention relates to a telephoto lens system composed of a total of five lenses, and to a lens system arranged from a focal object side to a first lens, a second lens, a third lens, a fourth lens, and a fifth lens.

In particular, the present invention is a telephoto lens system having the effective focal length of 11 mm or more in the total lens system, but having a reflector between the second lens and the third lens to form a structure for bending the optical axis, thereby minimizing the height of the entire lens system to be applied to a small camera module, especially a smartphone.

Figure 1:
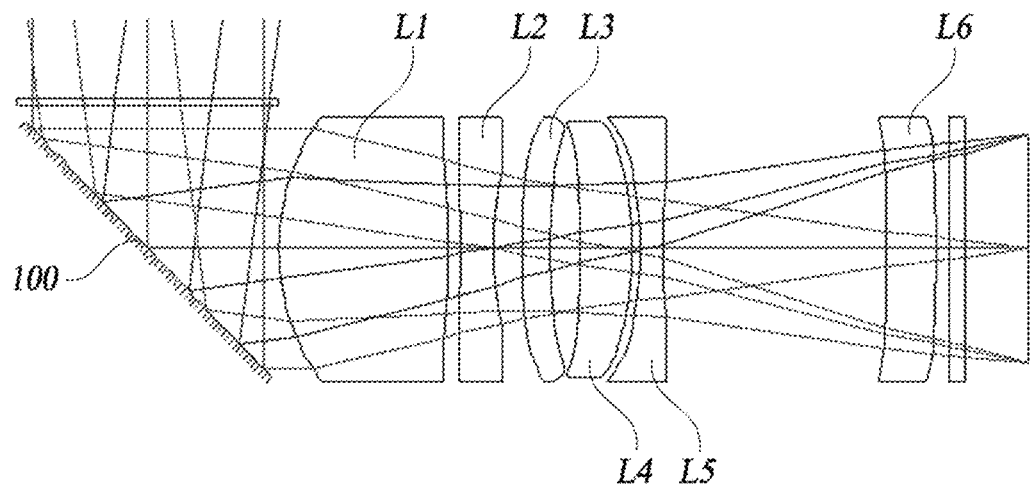
FIG. 1 is a schematic diagram of a conventional telephoto lens system.
Figure 2:
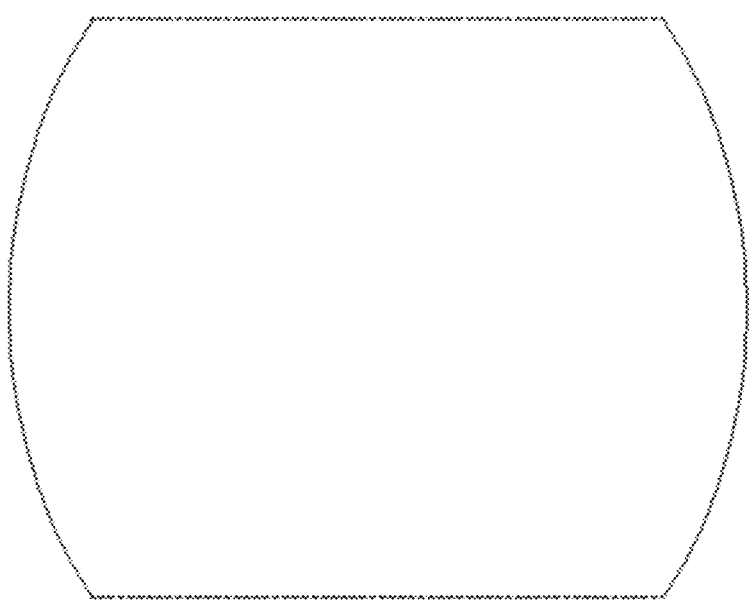
FIG. 2 is a diagram showing an example used in the conventional telephoto lens system in which an upper portion and a lower portion of the effective diameter of the lens are cut off.
Figure 3:
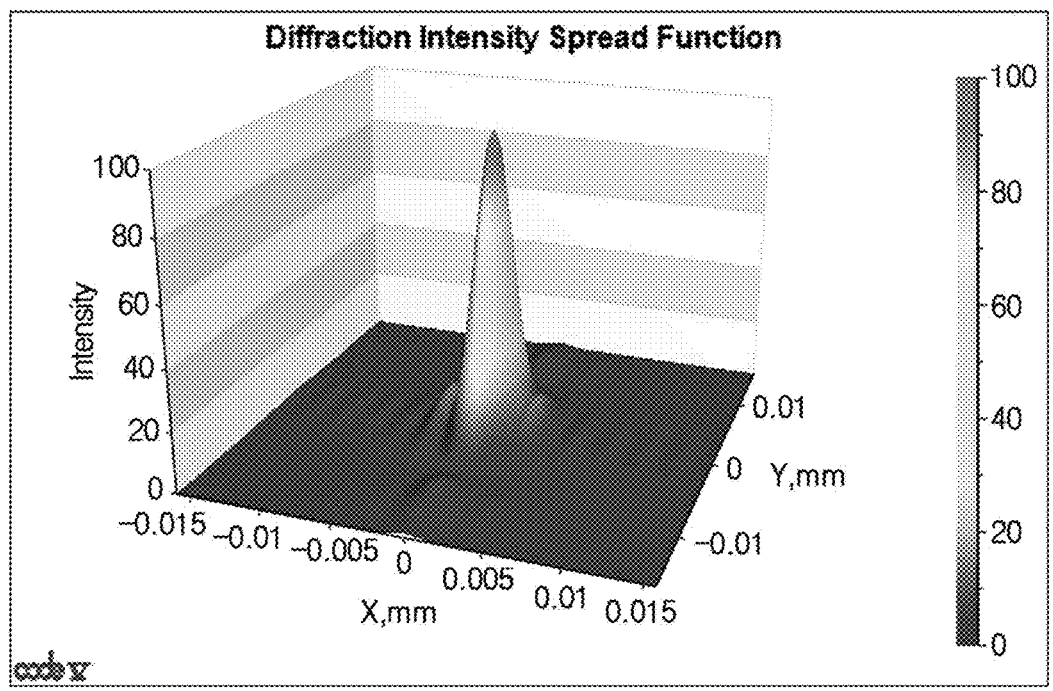
FIG. 3 is a diagram showing that there is a problem in that the lens system of FIG. 2 causes diffraction and reduces resolution.
Figure 4:
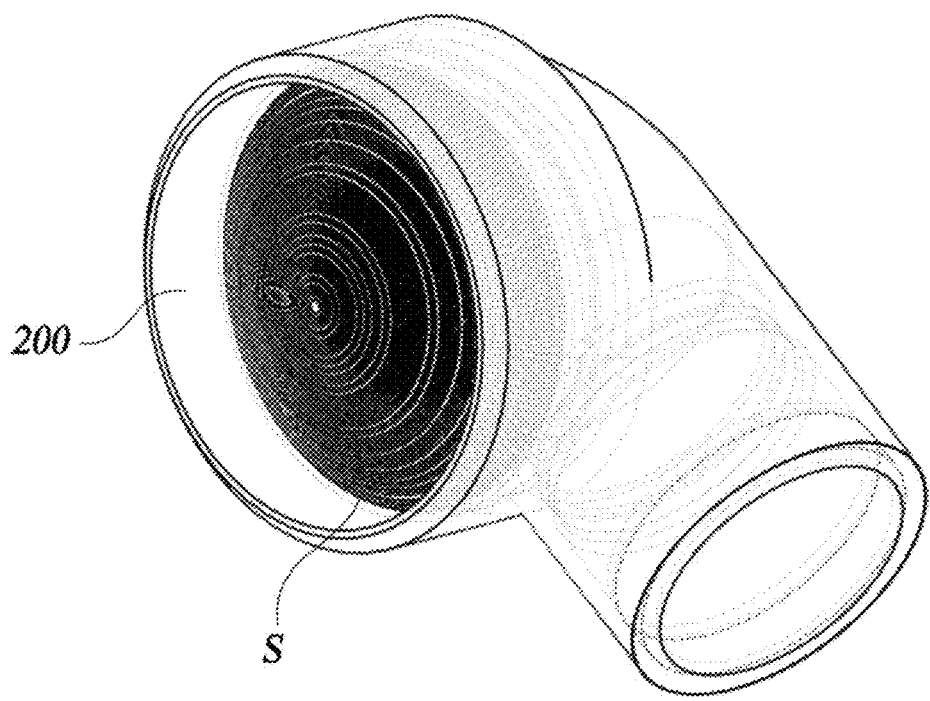
FIG. 4 is a perspective diagram of the main part of a telephoto lens system according to the present invention.
Figure 5:
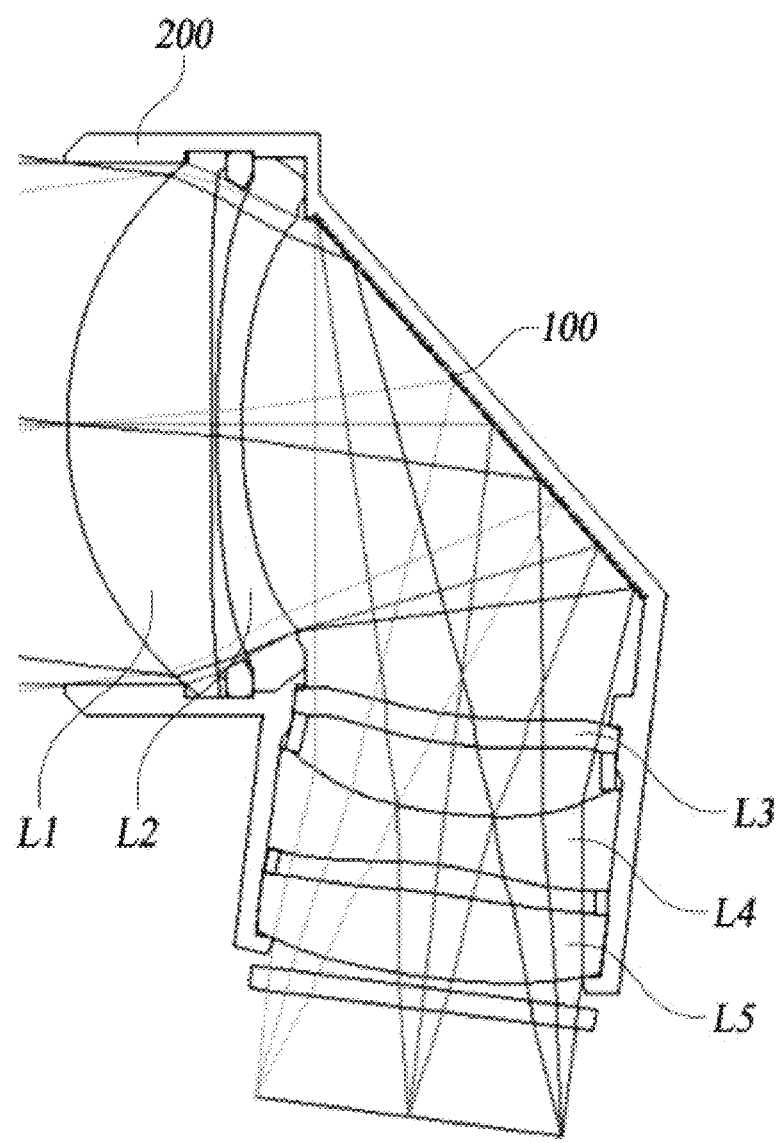
FIG. 5 is a schematic diagram of the telephoto lens system according to the present invention.
Figure 6:
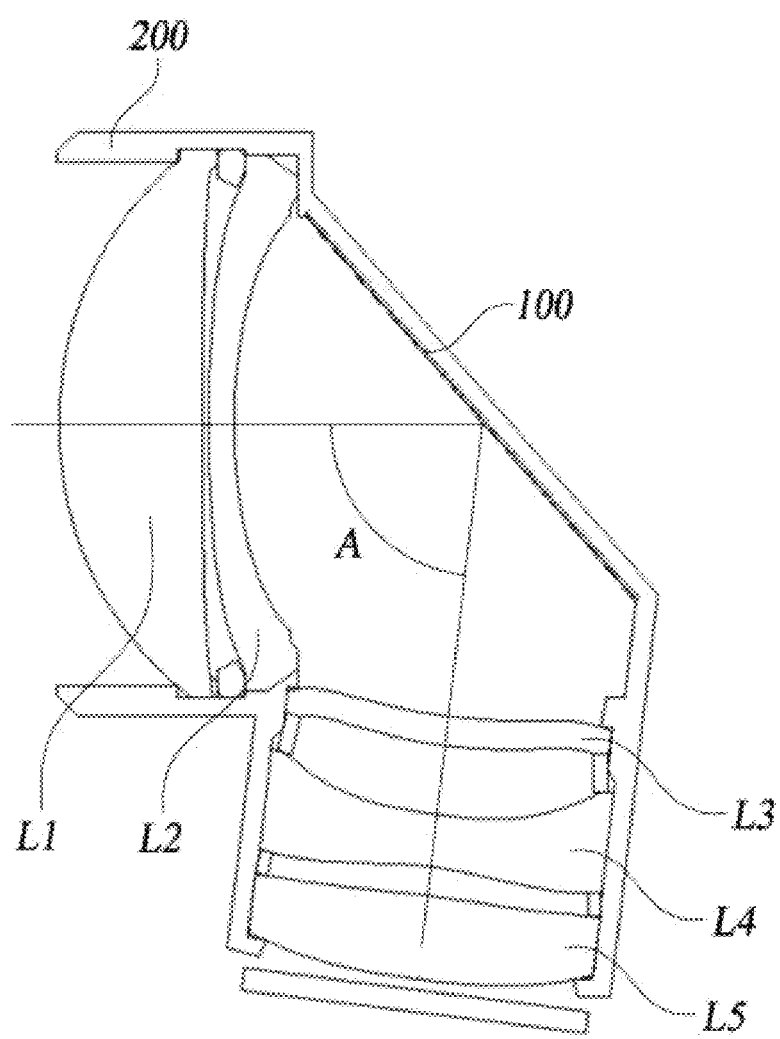
FIG. 6 is a sectional schematic diagram of the telephoto lens system according to the present invention.

Hereinafter, with reference to the accompanying drawings, the present invention will be described in detail. FIG. 4 shows a perspective view of the main part of the telephoto lens system according to the present invention, FIG. 5 shows a schematic diagram of the telephoto lens system according to the present invention, FIG. 6 is a cross-sectional schematic diagram of the telephoto lens system according to the present invention.

Figure 7:
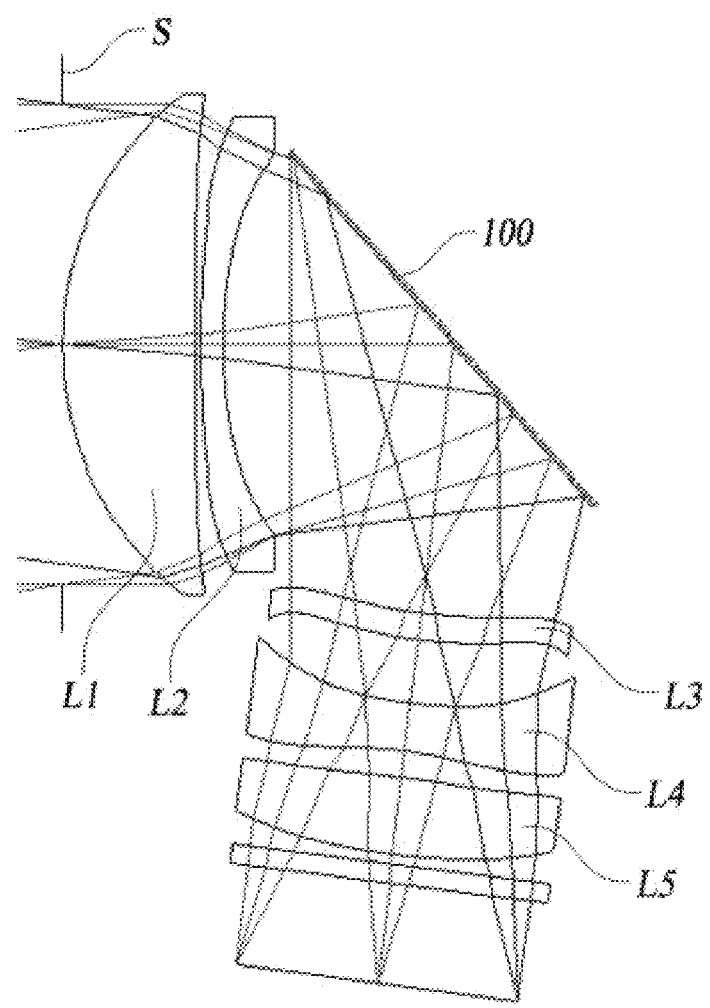
FIG. 7 is a diagram showing a first exemplary embodiment of the telephoto lens system according to the present invention.
Figure 8:
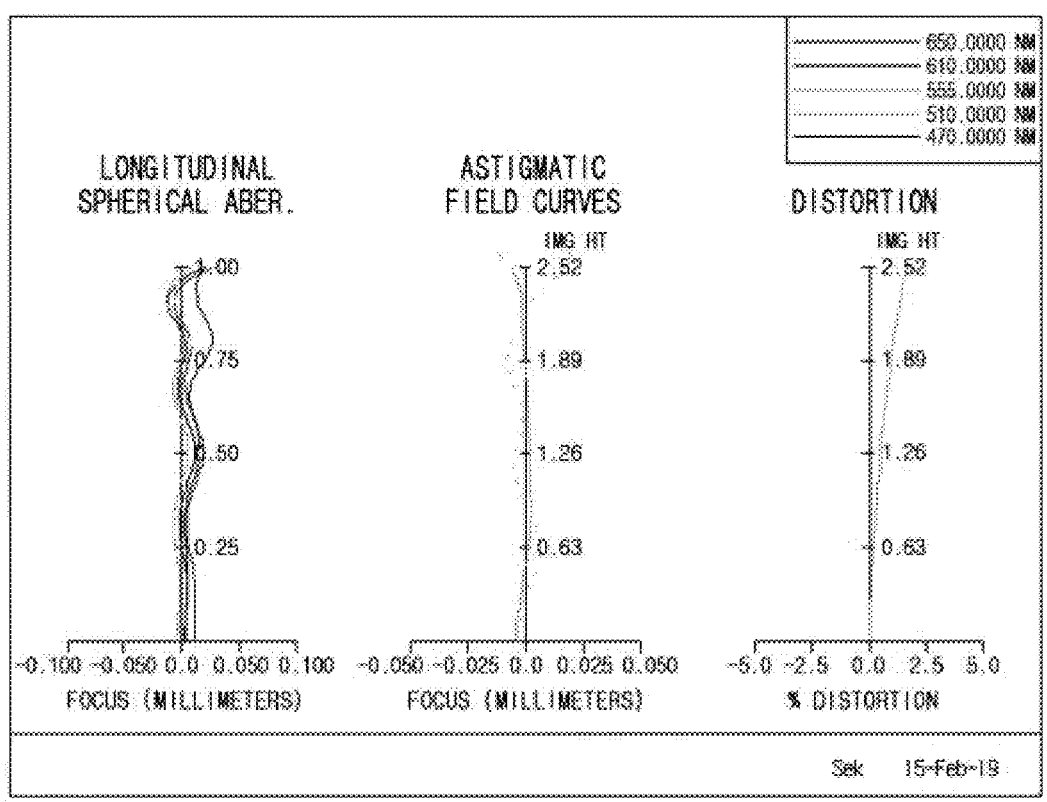
FIG. 8 is an aberrational diagram according to the first exemplary embodiment of the present invention.
Figure 9:
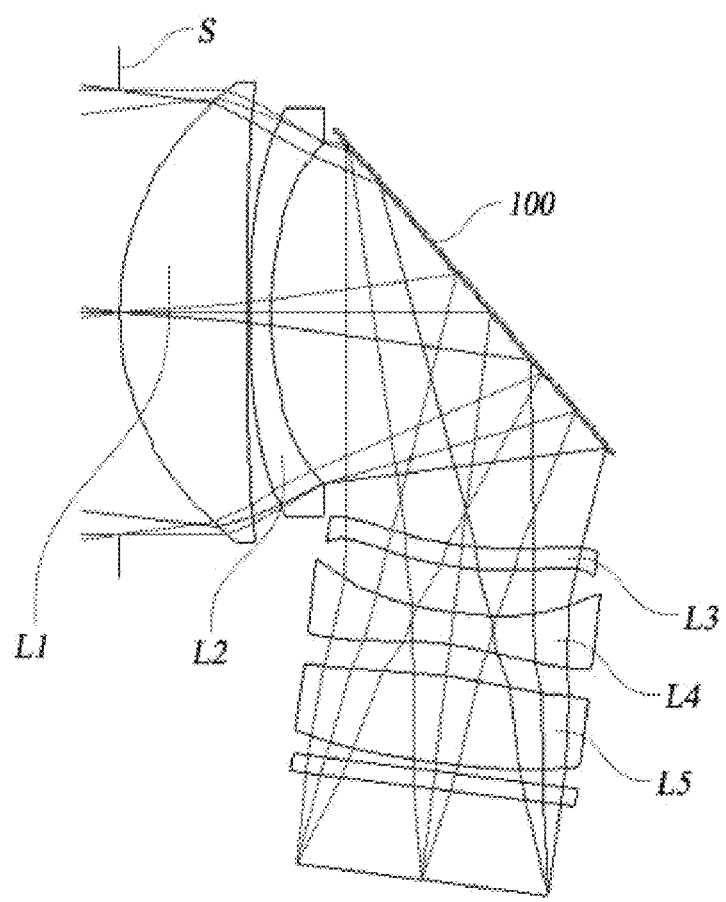
FIG. 9 is a diagram showing a second exemplary embodiment of the telephoto lens system for high resolution according to the present invention.
Figure 10:
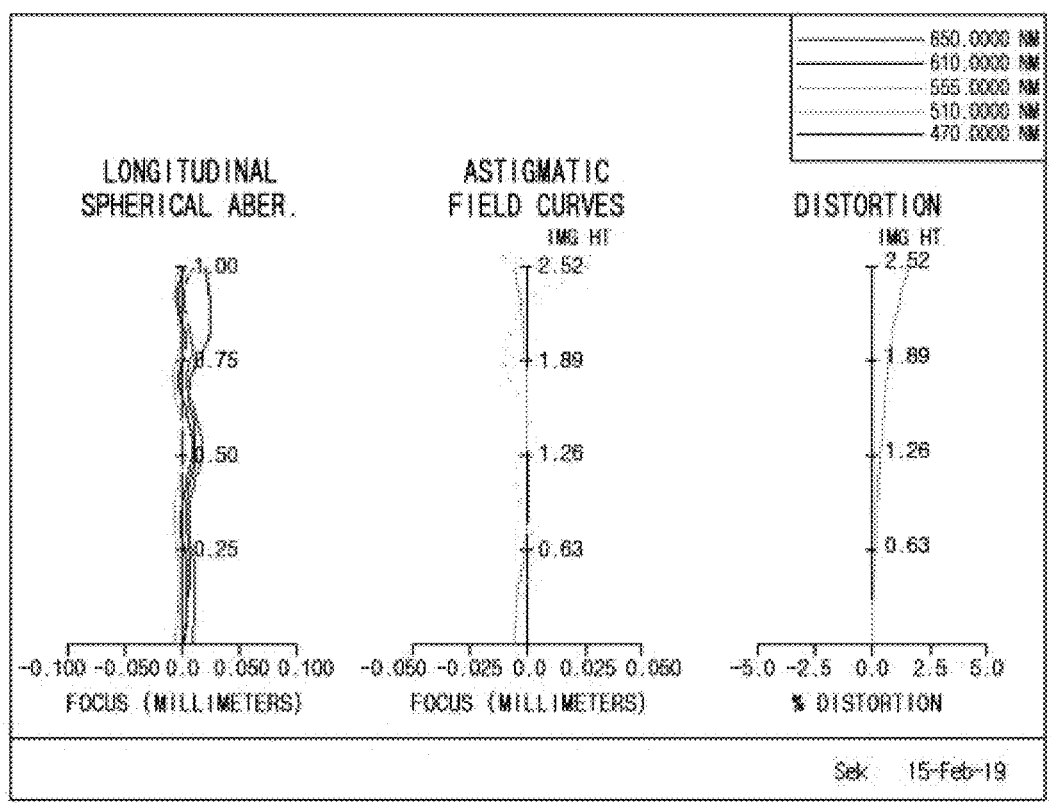
FIG. 10 is an aberrational diagram according to the second exemplary embodiment of the present invention.
Figure 11:
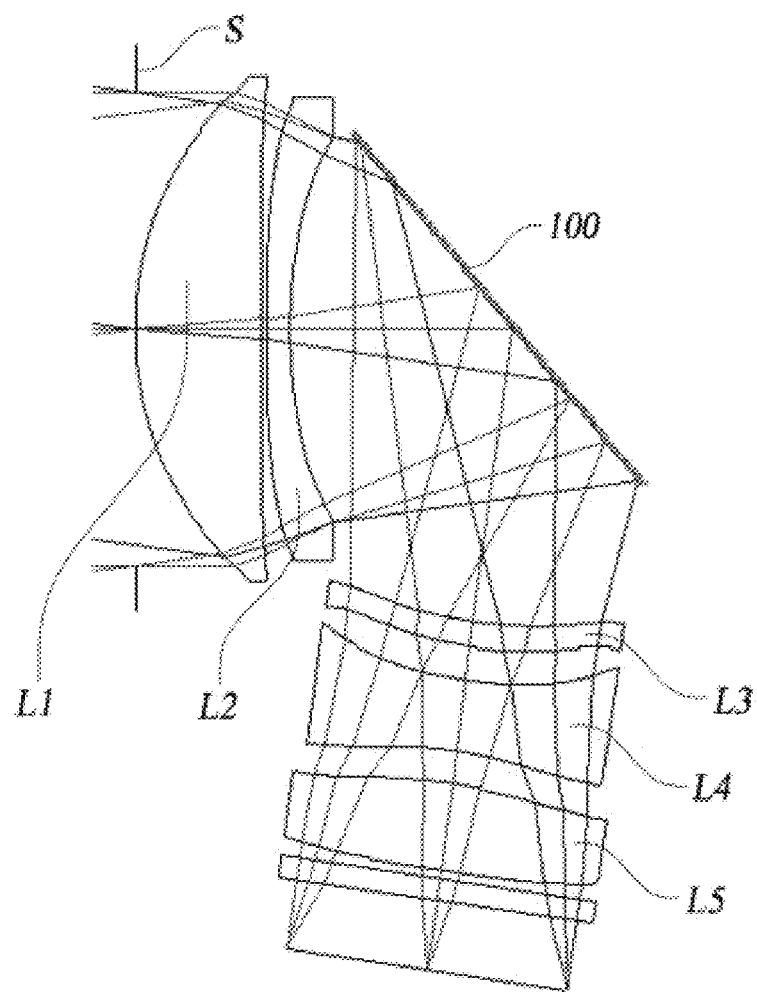
FIG. 11 is a diagram showing a third exemplary embodiment of the telephoto lens system according to the present invention.
Figure 12:
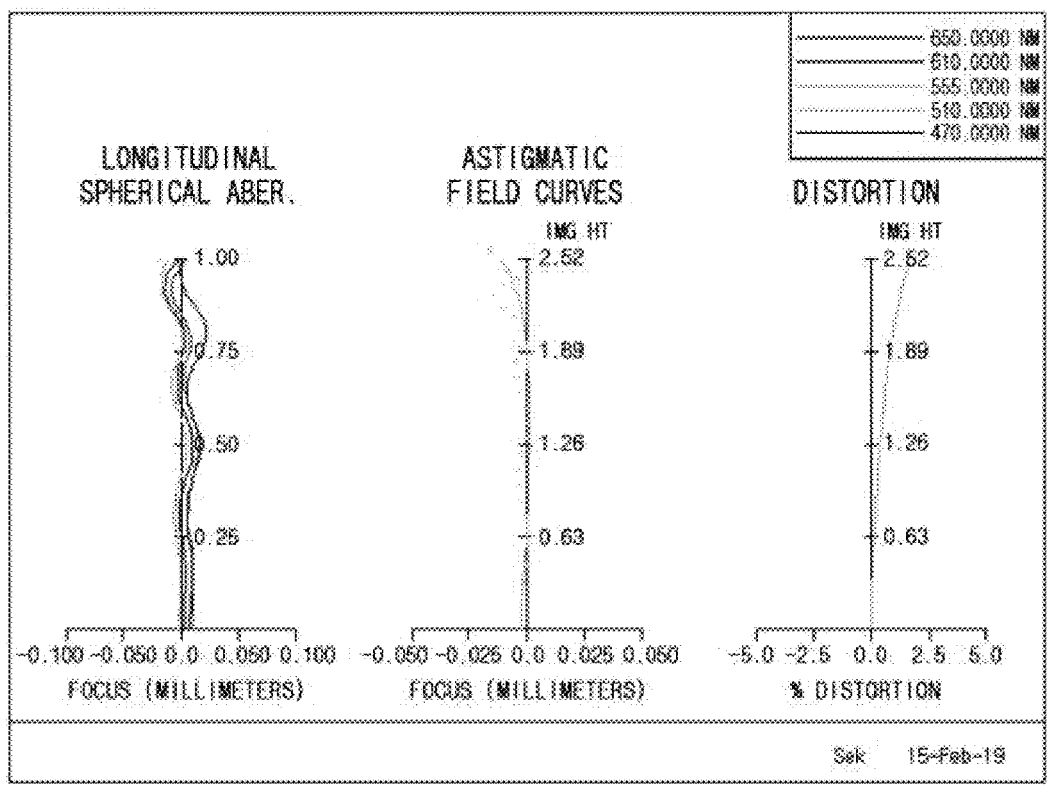
FIG. 12 is an aberrational diagram according to the third exemplary embodiment of the present invention.
Figure 13:
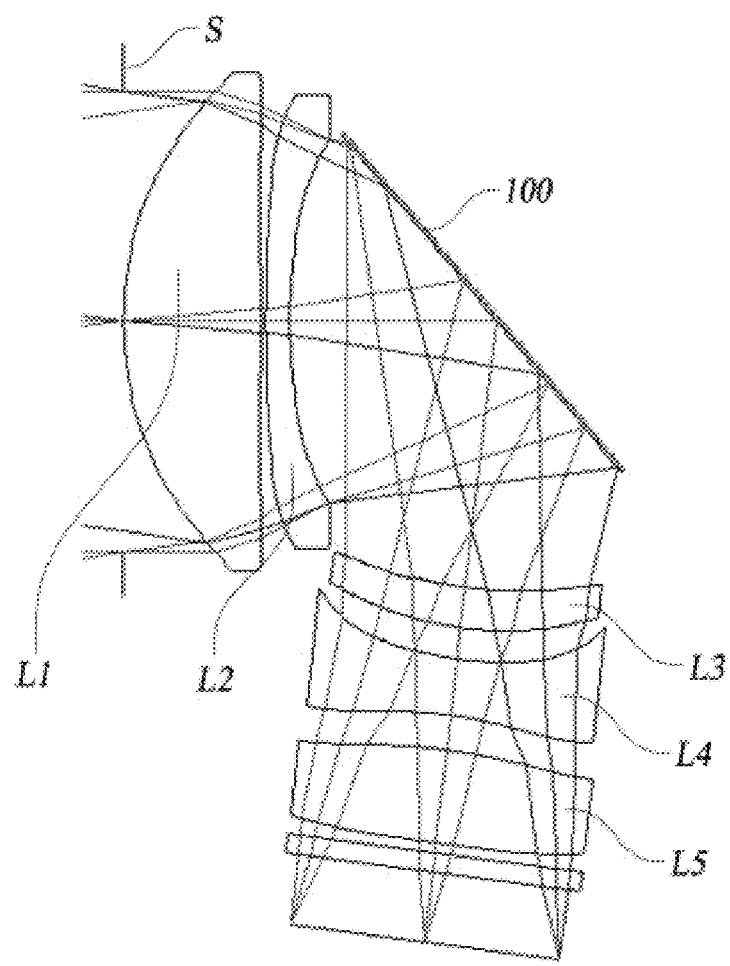
FIG. 13 is a diagram showing a fourth exemplary embodiment of the telephoto lens system according to the present invention.
Figure 14:
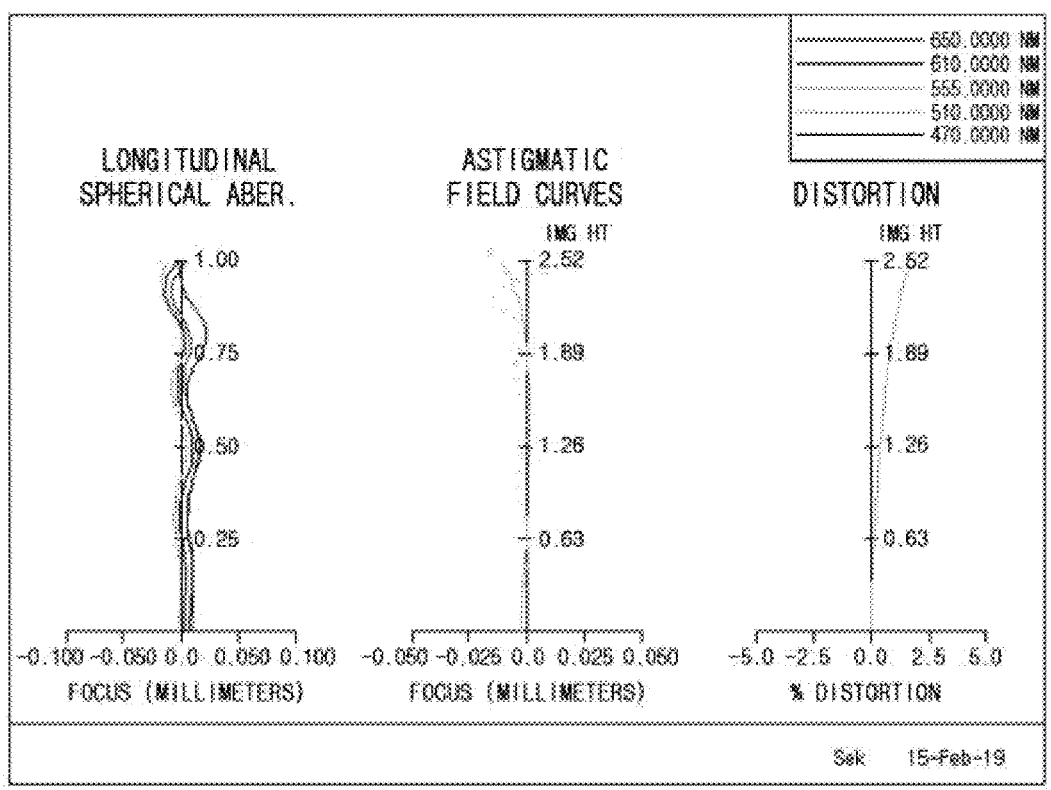
FIG. 14 is an aberrational diagram according to the fourth exemplary embodiment of the present invention.
Figure 15:
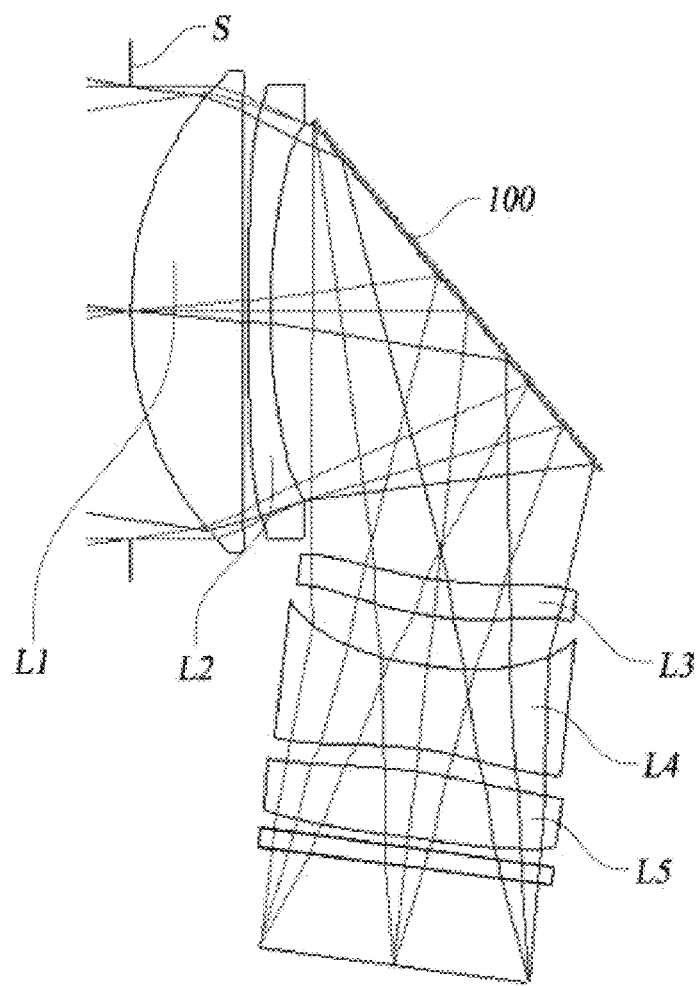
FIG. 15 is a diagram showing a fifth exemplary embodiment of the telephoto lens system according to the present invention.
Figure 16:
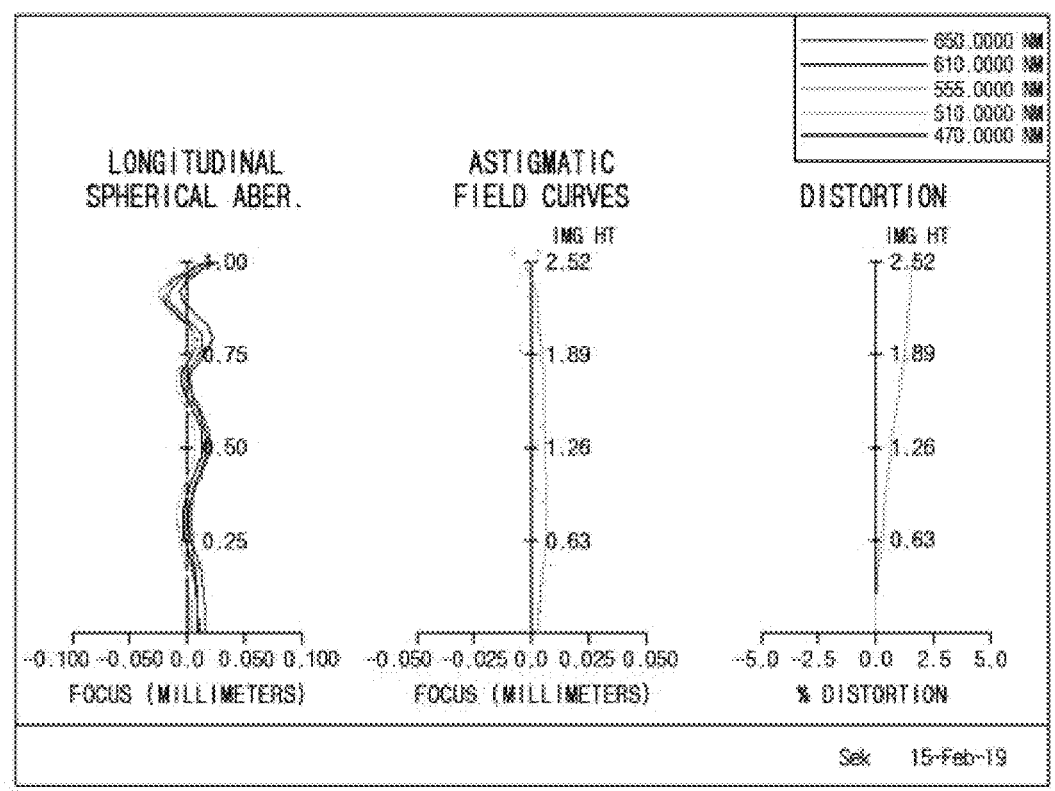
FIG. 16 is an aberrational diagram according to the fifth exemplary embodiment of the present invention.

FIG. 7 shows a first embodiment of a telephoto lens system according to the present invention, FIG. 8 is a diagram showing an aberration diagram according to the first embodiment of the present invention, and FIG. 9 is a diagram of a telephoto lens system for high resolution according to the present invention. FIG. 10 is a diagram showing an aberration diagram according to the second embodiment of the present invention. FIG. 11 is a diagram showing a third embodiment of the telephoto lens system according to the present invention. FIG. 12 is a diagram showing an aberration diagram according to the third embodiment of the present invention. FIG. 13 is a diagram showing a fourth embodiment of the telephoto lens system according to the present invention. FIG. 14 is a diagram showing an aberration diagram according to the fourth embodiment of the present invention, and FIG. 15 is a diagram showing a fifth embodiment of the telephoto lens system according the present invention, and FIG. 16 is an aberration diagram according to the fifth embodiment of the present invention.

As shown in the diagrams, the present invention relates to a telephoto lens system in which a plurality of lenses is arranged from a focal object side, including a first lens L1 with positive refractive power, a second lens L2 with a negative refractive power, a third lens L3 with a negative refractive power, a fourth lens L4 with a negative refractive power, and a fifth lens L5 with positive refractive power, and while the second lens L2 has a reflector 100 for bending the optical axis between the second lens L2 and the third lens L3.

Thus, the present invention allows each lens to have evenly distributed positive and negative refractive power to realize smallness and lightness and to correct distortion. The telephoto lens system has a long effective focal length of 11 mm or more, but the reflector 100 is provided between the third lens L2 and the third lens L3 to form a structure for bending an optical axis so that the telephoto lens system is applicable to small electronic devices, especially to a smartphone.

In particular, by allowing that the first lens L1 has a positive refractive power, the second lens L2 to fourth lenses L4 have a negative refractive power, and the fifth lens L5 has a positive refractive power, and by adequately adjusting the shape and refractive power of the lens, it is possible to provide a small and lightweight lens system while maintaining performance with high resolution by correcting distortion and having a low F-number.

In addition, the reflector 100 for bending the optical axis, such as a reflecting mirror, is provided between the second lens L2 and the third lens L3 to form a structure for bending the optical axis, thereby minimizing the height of the entire lens system. Therefore, a small telephoto lens system is applicable to small electronic devices such as a smartphone in particular.

Here, the telephoto lens system according to the present invention has a structure in which the effective focal length f is 11 mm to 15 mm, and the optical axis is bent by equipping the reflector 100 between the second lens L2 and the third lens L3. To minimize the height, the first lens L1 has a strong positive refractive power and is convex toward the focal object side, and the second lens L2 has a strong negative refractive power and is concave toward the image side. The fourth lens L4 has a negative refractive power, and the fifth lens L5 has a positive refractive power.

To this end, the angle A between the optical axis of the second lens L2 and the optical axis of the third lens L3 has a value of 80°≤A≤86°, which is smaller than 90°.

In addition, the third lens L3 has weak refractive power, and the refractive power P3 of the third lens L3 has a value of −0.1<P3<0.1 so as to correct astigmatism and spherical aberration.

In addition, the telephoto lens system according to the present invention includes a stop S is arranged in front of the focal object side of the first lens L1 to block unnecessary light causing the resolution degradation, and a barrel 200 surrounding the first lens L1 playing a role of the stop S is formed by protruding toward a focal object than the first lens L1, and an inner diameter is smaller than or equal to the effective diameter of the first lens L1.

In addition, the stop S is formed in a circular shape to minimize the resolution degradation due to the diffraction caused by the stop, the effective diameter of the first lens L1 being formed in a circular shape.

In addition, a large spatial gap is required for the reflector 100 to be equipped between the second lens L2 and the third lens L3. To this end, a composite focal length f12 of the first lens L1 and the second lens L2, a composite focal length f345 of the third lens L3, the fourth lens L4 and the fifth lens L5 satisfy f12>5, f345<−5, and 0.5<|f12/f345|<1.5.

In addition, to correct the chromatic aberration of the lens, the Abbe number V1 of the first lens L1 satisfies 50<V1<60, and the Abbe number V2 of the second lens L2 satisfies 15<V2<30.

Here, the second lens L2, the third lens L3, the fourth lens L4, and the fifth lens L5 are formed of plastic material, and are aspherical lenses. In addition, at least one of the third lens L3, the fourth lens L4, and the fifth lens L5 may have different Abbe numbers.

In addition, in order to realize the high resolution of the lens, the second lens L2 to the fifth lens L5 are formed of plastic material and are aspherical lenses.

Embodiments of the present invention will be described more fully hereinafter with reference to the accompanying drawings.

Embodiment 1

FIG. 7 shows a first embodiment of a wide-angle lens system for high resolution according to the present invention.

As shown, the first lens L1, the second lens L2, the third lens L3, the fourth lens L4, and the fifth lens L5 are arranged in sequence from the focal object side along the optical axis.

Table 1 shows numerical data of the lenses configuring the optical system according to the first embodiment of the present invention.

TABLE 1

| Surface (Surface Number) | RDY (Curvature Radius) | THI (Thickness) | Nd (Refractive Index) | Vd (Abbe Number) |
|---|---|---|---|---|
| FOCAL OBJECT | INFINITY | INFINITY | | |
| STOP | INFINITY | 0.01 | | |
| 2 | 3.338 | 1.41 | 1.544 | 56 |
| 3 | −127.32417 | 0.05 | | |
| 4 | 12.200 | 0.25 | 1.661 | 20.4 |
| 5 | 4.882 | 2.44 | | |
| MIRROR | INFINITY | −2.80 | | |
| 7 | 5.835 | −0.28 | 1.535 | 56 |
| 8 | 4.963 | −0.66 | | |
| 9 | 6.768 | −0.50 | 1.544 | 56 |
| 10 | −3.973 | −0.28 | | |
| 11 | −12.654 | −0.80 | 1.635 | 23.9 |
| 12 | 10.132 | −0.10 | | |
| 13 | INFINITY | −0.21 | 1.517 | 64.2 |
| 14 | INFINITY | −1.03 | | |
| IMAGE | INFINITY | 0.00 | | |

As shown in FIG. 7, the first lens L1, the second lens L2, the third lens L3, the fourth lens L4, and the fifth lens L5 are arranged from the focal object side. When the optical axis direction is set to X-axis and the direction orthogonal to the optical axis is set to the Y-axis, then the aspherical expression is as follows.

$$X(Y) = \frac{Y^2}{R} \frac{1}{1+\sqrt{1-(1+K)\left(\frac{Y}{R}\right)^2}} + A_3 Y^4 + A_4 Y^6 + A_5 Y^8 + A_6 Y^{10} + \ldots + A_{14} Y^{26}$$ [Equation 1]

An aspheric surface is a curved surface produced by rotating a curve obtained from the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 2 below.

TABLE 2

| | K | A3 | A4 | A5 | A6 |
|---|---|---|---|---|---|
| s2 | −0.065896 | 1.131470E−03 | −3.156960E−04 | 4.065760E−04 | −2.157590E−04 |
| s3 | −43.581959 | −7.381370E−04 | 6.615450E−03 | −4.555150E−03 | 1.703550E−03 |
| s4 | −1.290839 | −9.194780E−03 | 1.418330E−02 | −9.453280E−03 | 3.942620E−03 |
| s5 | 2.381818 | −7.394750E−03 | 7.689610E−03 | −2.105920E−03 | −1.405080E−03 |
| s7 | 9.488563 | −2.387700E−03 | −1.892750E−02 | 1.703970E−02 | −1.930120E−02 |
| s8 | −7.369056 | 5.698700E−03 | −1.121280E−02 | 2.078720E−02 | −4.674550E−02 |
| s9 | 13.16332 | 5.338220E−02 | −1.094010E−02 | −2.067760E−04 | 3.704070E−04 |
| s10 | −18.606755 | 4.567370E−02 | −1.815370E−02 | 6.678780E−03 | −1.583650E−03 |

TABLE 2-continued

| | | | | | |
|---|---|---|---|---|---|
| s11 | −8.038524 | 3.297780E−02 | −1.379710E−02 | 4.454580E−03 | −8.033710E−04 |
| s12 | 0 | 1.890130E−02 | −3.728550E−03 | 5.055080E−04 | 1.050540E−05 |

| | A7 | A8 | A9 | A10 | A11 |
|---|---|---|---|---|---|
| s2 | 6.916550E−05 | −1.371810E−05 | 1.643130E−06 | −1.103830E−07 | 3.273700E−09 |
| s3 | −3.902290E−04 | 5.533810E−05 | −4.619860E−06 | 2.044180E−07 | −3.882440E−09 |
| s4 | −1.019460E−03 | 1.619840E−04 | −1.521250E−05 | 8.239510E−07 | −2.515090E−08 |
| s5 | 1.611870E−03 | −6.242380E−04 | 1.135910E−04 | −8.459980E−06 | 8.180990E−08 |
| s7 | 1.315070E−02 | −6.070010E−03 | 1.741280E−03 | −2.750620E−04 | 1.851780E−05 |
| s8 | 5.305790E−02 | −3.611290E−02 | 1.455160E−02 | −3.229230E−03 | 3.040290E−04 |
| s9 | 5.515160E−05 | −4.957590E−05 | −7.922460E−06 | 3.496470E−07 | −1.237000E−07 |
| s10 | 2.785380E−04 | −3.095190E−05 | 8.677550E−07 | 7.359800E−08 | 1.628280E−08 |
| s11 | 7.661750E−05 | −3.843600E−06 | 8.662500E−08 | −1.238640E−10 | −1.791320E−11 |
| s12 | −1.949250E−05 | 2.856770E−06 | −1.814690E−07 | 5.476980E−09 | −6.450110E−11 |

The refractive power P3 of the third lens L3 is 0.018 and the total focal length f is 12.2. The composite focal length f12 of the first lens L1 and the second lens L2 is 9.75. The composite focal length f345 of the third lens L3, the fourth lens L4 and the fifth lens L5 is −13.09, and |f12/f345|=0.74. The Abbe number V1 of the first lens L1 is 56.0 and the Abbe number V2 of the second lens L2 is 20.4.

FIG. 8 shows an aberration diagram according to the first embodiment of the present invention.

The first data of FIG. 8 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the first embodiment according to the present invention is 0.025 mm or less (focus) and is considered to be good.

The second data of FIG. 8 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the first embodiment according to the present invention is 0.025 mm or less (focus) and is considered to be good.

The third data of FIG. 8 shows distortion aberration, where the horizontal axis represents the distortion degree (%) and the vertical axis represents the height (mm). Generally, it is known to be good if the aberration curve is in the range of −2~2%. Optical distortion, which is the distortion aberration of the first embodiment according to the present invention, is judged to be good at 2% or less.

Embodiment 2

FIG. 9 shows a second embodiment of a wide-angle lens system for high resolution according to the present invention.

As shown, the first lens L1, the second lens L2, the third lens L3, the fourth lens L4, and the fifth lens L5 are arranged in sequence from the focal object side along the optical axis.

Table 3 shows numerical data of the lenses configuring the optical system according to the second embodiment of the present invention.

TABLE 3

| Surface (Surface Number) | RDY (Curvature Radius) | THI (Thickness) | Nd (Refractive Index) | Vd (Abbe Number) |
|---|---|---|---|---|
| FOCAL OBJECT | INFINITY | INFINITY | | |
| STOP | INFINITY | 0.01 | | |
| 2 | 3.244 | 1.49 | 1.544 | 56 |
| 3 | 301.95596 | 0.05 | | |
| 4 | 9.860 | 0.25 | 1.661 | 20.4 |
| 5 | 4.350 | 2.60 | | |
| MIRROR | INFINITY | −2.70 | | |
| 7 | 5.609 | −0.25 | 1.535 | 56 |
| 8 | 4.804 | −0.53 | | |
| 9 | 6.305 | −0.37 | 1.544 | 56 |
| 10 | −4.350 | −0.36 | | |
| 11 | −8.017 | −1.00 | 1.635 | 23.9 |
| 12 | 22.416 | −0.10 | | |
| 13 | INFINITY | −0.21 | 1.517 | 64.2 |
| 14 | INFINITY | −1.04 | | |
| IMAGE | INFINITY | 0.00 | | |

Aspheric coefficients having data of the above lenses from Equation 1 are shown in Table 4 below.

TABLE 4

| | K | A3 | A4 | A5 | A6 |
|---|---|---|---|---|---|
| s2 | −0.078458 | 9.953660E−04 | −3.197930E−04 | 4.009350E−04 | −2.151860E−04 |
| s3 | 99 | −4.907970E−04 | 6.605030E−03 | −4.560920E−03 | 1.702460E−03 |
| s4 | 3.117453 | −8.728030E−03 | 1.416450E−02 | −9.469900E−03 | 3.940490E−03 |
| s5 | 2.675275 | −7.860260E−03 | 7.393250E−03 | −2.069020E−03 | −1.426020E−03 |
| s7 | 9.09749 | 1.383220E−02 | −2.172130E−02 | 1.712250E−02 | −1.927560E−02 |
| s8 | −0.127605 | 1.104380E−02 | −1.174050E−02 | 2.078450E−02 | −4.646350E−02 |
| s9 | 11.822936 | 3.109650E−02 | −3.798900E−03 | −6.398080E−04 | −2.341530E−04 |
| s10 | −21 | 3.150650E−02 | −1.378810E−02 | 6.147220E−03 | −1.658080E−03 |
| s11 | 6.54956 | 3.297780E−02 | −1.379710E−02 | 4.454580E−03 | −8.033710E−04 |
| s12 | 0 | 1.890130E−02 | −3.728550E−03 | 5.055080E−04 | 1.050540E−05 |

TABLE 4-continued

|    | A7           | A8           | A9           | A10          | A11          |
|----|--------------|--------------|--------------|--------------|--------------|
| s2 | 6.924850E-05 | -1.371680E-05 | 1.642310E-06 | -1.105350E-07 | 3.254160E-09 |
| s3 | -3.903450E-04 | 5.532860E-05 | -4.619810E-06 | 2.047500E-07 | -3.775330E-09 |
| s4 | -1.019880E-03 | 1.619340E-04 | -1.521100E-05 | 8.259500E-07 | -2.451420E-08 |
| s5 | 1.609440E-03 | -6.239340E-04 | 1.136250E-04 | -8.471490E-06 | 8.342800E-08 |
| s7 | 1.308560E-02 | -6.055060E-03 | 1.741280E-03 | -2.750600E-04 | 1.852010E-05 |
| s8 | 5.282410E-02 | -3.605130E-02 | 1.455160E-02 | -3.229230E-03 | 3.040310E-04 |
| s9 | 2.913690E-04 | -9.186000E-05 | -7.919480E-06 | 3.534850E-07 | -1.195110E-07 |
| s10 | 2.932490E-04 | -2.786850E-05 | 1.890090E-07 | -1.735260E-07 | 6.696660E-08 |
| s11 | 7.661750E-05 | -3.843600E-06 | 8.662500E-08 | -1.238640E-10 | -1.791320E-11 |
| s12 | -1.949250E-05 | 2.856770E-06 | -1.814690E-07 | 5.476980E-09 | -6.450110E-11 |

The refractive power P3 of the third lens L3 is 0.018 and the total focal length f is 12.5, the composite focal length f12 of the first lens L1 and the second lens L2 is 9.92, and the composite focal length f345 of the third lens L3, the fourth lens L4 and the fifth lens L5 is -12.96, and |f12/f345|=0.77. The Abbe number V1 of the first lens L1 is 56.0 and the Abbe number V2 of the second lens L2 is 20.4.

FIG. 10 shows an aberration diagram according to the second embodiment of the present invention.

The first data of FIG. 10 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the second embodiment according to the present invention is 0.025 mm or less (focus) and is considered to be good.

The second data of FIG. 10 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the second embodiment according to the present invention is 0.025 mm or less (focus) and is considered to be good.

The third data of FIG. 10 shows distortion aberration, where the horizontal axis represents the distortion degree (%) and the vertical axis represents the height (mm). Generally, it is known to be good if the aberration curve is in the range of -2~2%. Optical distortion, which is the distortion aberration of the second embodiment according to the present invention, is judged to be good at 2% or less.

Embodiment 3

FIG. 11 shows a third embodiment of a wide-angle lens system for high resolution according to the present invention.

As shown, the first lens L1, the second lens L2, the third lens L3, the fourth lens L4, and the fifth lens L5 are arranged in sequence from the focal object side along the optical axis.

Table 5 shows numerical data of the lenses configuring the optical system according to the third embodiment of the present invention.

TABLE 5

| Surface (Surface Number) | RDY (Curvature Radius) | THI (Thickness) | Nd (Refractive Index) | Vd (Abbe Number) |
|---|---|---|---|---|
| FOCAL OBJECT | INFINITY | INFINITY | | |
| STOP | INFINITY | 0.01 | | |
| 2 | 3.368 | 1.34 | 1.544 | 56 |
| 3 | -44.17484 | 0.05 | | |
| 4 | 15.040 | 0.26 | 1.661 | 20.4 |
| 5 | 5.255 | 2.38 | | |
| MIRROR | INFINITY | -3.00 | | |
| 7 | 5.629 | -0.26 | 1.535 | 56 |
| 8 | 4.697 | -0.34 | | |
| 9 | 6.160 | -0.73 | 1.544 | 56 |
| 10 | -3.629 | -0.34 | | |
| 11 | -5.455 | -0.88 | 1.635 | 23.9 |
| 12 | 2000.000 | -0.10 | | |
| 13 | INFINITY | -0.21 | 1.517 | 64.2 |
| 14 | INFINITY | -0.72 | | |
| IMAGE | INFINITY | 0.00 | | |

Aspheric coefficients having data for the above lenses from Equation 1 are shown in Table 6 below.

TABLE 6

|    | K | A3 | A4 | A5 | A6 |
|----|----|----|----|----|----|
| s2 | -0.07232 | 1.0252500E-03 | -3.0125700E-04 | 4.0569800E-04 | -2.1579900E-04 |
| s3 | -99 | -6.5545400E-04 | 6.6430600E-03 | -4.5525200E-03 | 1.7035900E-03 |
| s4 | -6.674966 | -9.5346200E-03 | 1.4149900E-02 | -9.4519000E-03 | 3.9436300E-03 |
| s5 | 2.215586 | -7.8805300E-03 | 7.6231800E-03 | -2.1121000E-03 | -1.4025400E-03 |
| s7 | 9.688838 | 1.6558200E-02 | -1.7831000E-02 | 1.6690100E-02 | -1.9248300E-02 |
| s8 | 2.363115 | 1.4127200E-02 | -1.2687600E-02 | 2.2098700E-02 | -4.6745900E-02 |
| s9 | 11.745598 | 3.1447800E-02 | -8.5703300E-03 | -1.2324200E-04 | 5.7773900E-04 |
| s10 | -15.532818 | 2.6404900E-02 | -1.3591200E-02 | 6.5143200E-03 | -1.6950000E-03 |
| s11 | 0.72286 | 3.2977800E-02 | -1.3797100E-02 | 4.4545800E-03 | -8.0337100E-04 |
| s12 | 0 | 1.8901300E-02 | -3.7285500E-03 | 5.0550800E-04 | 1.0505400E-05 |

|    | A7 | A8 | A9 | A10 | A11 |
|----|----|----|----|----|----|
| s2 | 6.9214100E-05 | -1.3710300E-05 | 1.6432800E-06 | -1.1052700E-07 | 3.2427900E-09 |
| s3 | -3.9025500E-04 | 5.5336500E-05 | -4.6198800E-06 | 2.0427100E-07 | -3.9625100E-09 |

TABLE 6-continued

| | | | | | |
|---|---|---|---|---|---|
| s4 | −1.0192600E−03 | 1.6198400E−04 | −1.5220000E−05 | 8.2233500E−07 | −2.5145300E−08 |
| s5 | 1.6113100E−03 | −6.2438300E−04 | 1.1362400E−04 | −8.4472300E−06 | 7.6056000E−08 |
| s7 | 1.3142800E−02 | −6.0689000E−03 | 1.7412800E−03 | −2.7506200E−04 | 1.8517800E−05 |
| s8 | 5.2928500E−02 | −3.6051300E−02 | 1.4551600E−02 | −3.2292300E−03 | 3.0402900E−04 |
| s9 | 4.9637000E−05 | −9.1860900E−05 | −7.9224600E−06 | 3.4964700E−07 | −1.2370000E−07 |
| s10 | 2.7630800E−04 | −2.8079900E−05 | 1.1260400E−06 | 2.8633300E−09 | 7.5248900E−09 |
| s11 | 7.6617500E−05 | −3.8436000E−06 | 8.6625000E−08 | −1.2386400E−10 | −1.7913200E−11 |
| s12 | −1.9492500E−05 | 2.8567700E−06 | −1.8146900E−07 | 5.4769800E−09 | −6.4501100E−11 |

The refractive power P3 of the third lens L3 is 0.02 and the total focal length f is 11.8, the composite focal length f12 of the first lens L1 and the second lens L2 is 9.38, and the composite focal length f345 of the third lens L3, the fourth lens L4 and the fifth lens L5 is −10.66, and |f12/f345|=0.88. The Abbe number V1 of the first lens L1 is 56.0 and the Abbe number V2 of the second lens L2 is 20.4.

FIG. 12 shows an aberration diagram according to the third embodiment of the present invention.

The first data of FIG. 12 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the third embodiment according to the present invention is 0.025 mm or less (focus) and is considered to be good.

The second data of FIG. 12 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the third embodiment according to the present invention is 0.025 mm (focus) or less and is considered to be good.

The third data of FIG. 12 shows distortion aberration, where the horizontal axis represents the distortion degree (%) and the vertical axis represents the height (mm). Generally, it is known to be good if the aberration curve is in the range of −2~2%. Optical distortion, which is the distortion aberration of the third embodiment according to the present invention, is judged to be good at 2% or less.

Embodiment 4

FIG. 13 shows a fourth embodiment of a wide-angle lens system for high resolution according to the present invention. As shown, the first lens L1, the second lens L2, the third lens L3, the fourth lens L4, and the fifth lens L5 are arranged in sequence from the focal object side along the optical axis.

Table 7 shows numerical data of the lenses configuring the optical system according to the fourth embodiment of the present invention.

TABLE 7

| Surface (Surface Number) | RDY (Curvature Radius) | THI (Thickness) | Nd (Refractive Index) | Vd (Abbe Number) |
|---|---|---|---|---|
| FOCAL OBJECT | INFINITY | INFINITY | | |
| STOP | INFINITY | 0.01 | | |
| 2 | 3.331 | 1.53 | 1.544 | 56 |
| 3 | −39.33111 | 0.05 | | |
| 4 | 18.721 | 0.27 | 1.661 | 20.4 |
| 5 | 5.411 | 2.30 | | |
| MIRROR | INFINITY | −2.80 | | |
| 7 | 5.537 | −0.42 | 1.535 | 56 |
| 8 | 4.224 | −0.33 | | |
| 9 | 5.279 | −0.59 | 1.544 | 56 |
| 10 | −4.033 | −0.36 | | |
| 11 | −5.914 | −0.97 | 1.635 | 23.9 |
| 12 | INFINITY | −0.10 | | |
| 13 | INFINITY | −0.21 | 1.517 | 64.2 |
| 14 | INFINITY | −0.72 | | |
| IMAGE | INFINITY | 0.00 | | |

Aspheric coefficients having data for the above lenses from Equation 1 are shown in Table 8 below.

TABLE 8

| | K | A3 | A4 | A5 | A6 |
|---|---|---|---|---|---|
| s2 | −0.04123 | 8.654760E−04 | −3.541260E−04 | 4.154870E−04 | −2.187500E−04 |
| s3 | −99 | −4.343510E−04 | 6.699760E−03 | −4.545790E−03 | 1.701970E−03 |
| s4 | −4.615118 | −8.614480E−03 | 1.431040E−02 | −9.437490E−03 | 3.940170E−03 |
| s5 | 5.031678 | −8.728980E−03 | 7.581040E−03 | −2.232060E−03 | −1.368520E−03 |
| s7 | 9.538212 | 1.016150E−02 | −1.798220E−02 | 1.814090E−02 | −1.920970E−02 |
| s8 | 2.578491 | 4.184480E−03 | −1.007710E−02 | 2.349250E−02 | −4.604380E−02 |
| s9 | 9.108164 | 2.665340E−02 | −6.481450E−03 | 2.182530E−03 | 5.665470E−04 |
| s10 | −19.424215 | 2.568610E−02 | −1.256300E−02 | 6.789810E−03 | −1.788030E−03 |
| s11 | 1.722556 | 3.297780E−02 | −1.379710E−02 | 4.454580E−03 | −8.033710E−04 |
| s12 | 20.999987 | 1.890130E−02 | −3.728550E−03 | 5.055080E−04 | 1.050540E−05 |

| | A7 | A8 | A9 | A10 | A11 |
|---|---|---|---|---|---|
| s2 | 6.908880E−05 | −1.366290E−05 | 1.649070E−06 | −1.112000E−07 | 2.911150E−09 |
| s3 | −3.912320E−04 | 5.520740E−05 | −4.619000E−06 | 2.070100E−07 | −3.811750E−09 |
| s4 | −1.019120E−03 | 1.618970E−04 | −1.528980E−05 | 8.124870E−07 | −2.037440E−08 |

TABLE 8-continued

| s5 | 1.607360E−03 | −6.265760E−04 | 1.137000E−04 | −8.306440E−06 | 5.461130E−08 |
| s7 | 1.334330E−02 | −6.169430E−03 | 1.741280E−03 | −2.750620E−04 | 1.851780E−05 |
| s8 | 5.285540E−02 | −3.611490E−02 | 1.457420E−02 | −3.229230E−03 | 3.040290E−04 |
| s9 | −1.670280E−04 | −3.885960E−05 | 3.190130E−06 | 3.496470E−07 | −1.237000E−07 |
| s10 | 2.759510E−04 | −2.777780E−05 | 2.180940E−06 | −1.573000E−07 | 5.512590E−09 |
| s11 | 7.661750E−05 | −3.843600E−06 | 8.662500E−08 | −1.238640E−10 | −1.791320E−11 |
| s12 | −1.949250E−05 | 2.856770E−06 | −1.814690E−07 | 5.476980E−09 | −6.450110E−11 |

The refractive power P3 of the third lens L3 is 0.03, the total focal length f is 11.8. The composite focal length f12 of the first lens L1 and the second lens L2 is 9.35. The composite focal length f345 of the third lens L3, the fourth lens L4 and the fifth lens L5 is −10.93, and |f12/f345|=0.86. The Abbe number V1 of the first lens L1 is 56.0, and the Abbe number V2 of the second lens L2 is 20.4.

FIG. 14 shows an aberration diagram according to the fourth embodiment of the present invention.

The first data of FIG. 14 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the fourth embodiment according to the present invention is 0.025 mm or less (focus) and is considered to be good.

The second data of FIG. 14 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the fourth embodiment according to the present invention is 0.025 mm or less (focus) and is considered to be good.

The third data of FIG. 14 shows distortion aberration, where the horizontal axis represents the distortion degree (%) and the vertical axis represents the height (mm). Generally, it is known to be good if the aberration curve is in the range of −2~2%. Optical distortion, which is the distortion aberration of the fourth embodiment according to the present invention, is judged to be good at 2% or less.

Embodiment 5

FIG. 15 shows a fifth embodiment of a wide-angle lens system for high resolution according to the present invention.

As shown, the first lens L1, the second lens L2, the third lens L3, the fourth lens L4, and the fifth lens L5 are arranged in sequence from the focal object side along the optical axis.

Table 9 shows numerical data of the lenses configuring the optical system according to the fifth embodiment of the present invention.

TABLE 9

| Surface (Surface Number) | RDY (Curvature Radius) | THI (Thickness) | Nd (Refractive Index) | Vd (Abbe Number) |
|---|---|---|---|---|
| FOCAL OBJECT | INFINITY | INFINITY | | |
| STOP | INFINITY | 0.01 | | |
| 2 | 3.532 | 1.27 | 1.544 | 56 |
| 3 | −27.96682 | 0.05 | | |
| 4 | 44.296 | 0.25 | 1.661 | 20.4 |
| 5 | 7.282 | 2.20 | | |
| MIRROR | INFINITY | −2.80 | | |
| 7 | 6.038 | −0.38 | 1.535 | 56 |
| 8 | 4.408 | −0.52 | | |
| 9 | 5.443 | −0.86 | 1.544 | 56 |
| 10 | −4.507 | −0.24 | | |
| 11 | −7.005 | −0.69 | 1.635 | 23.9 |
| 12 | INFINITY | −0.10 | | |
| 13 | INFINITY | −0.21 | 1.517 | 64.2 |
| 14 | INFINITY | −1.04 | | |
| IMAGE | INFINITY | 0.00 | | |

Aspheric coefficients having data of the above lenses from Equation 1 are shown in Table 10 below.

TABLE 10

| | K | A3 | A4 | A5 | A6 |
|---|---|---|---|---|---|
| s2 | 0.006675 | 1.2735300E−03 | −3.7174100E−04 | 4.2933300E−04 | −2.1728400E−04 |
| s3 | −19.640101 | −6.6068300E−04 | 6.7008400E−03 | −4.5344800E−03 | 1.7064500E−03 |
| s4 | −9.593072 | −9.0702900E−03 | 1.4253100E−02 | −9.4409200E−03 | 3.9382800E−03 |
| s5 | 6.213906 | −7.2419400E−03 | 7.8018700E−03 | −2.2800700E−03 | −1.3708400E−03 |
| s7 | 6.092244 | −6.0105600E−03 | −1.6548700E−02 | 1.6845000E−02 | −1.9058700E−02 |
| s8 | −1.028778 | −2.0657700E−03 | −1.4464000E−02 | 2.3414400E−02 | −4.6474100E−02 |
| s9 | 10.052549 | 3.2013300E−02 | −1.0426100E−02 | 1.5751800E−03 | 5.9696300E−04 |
| s10 | −21 | 2.9066800E−02 | −1.3940800E−02 | 6.6208900E−03 | −1.7130700E−03 |
| s11 | −1.033766 | 3.2977800E−02 | −1.3797100E−02 | 4.4545800E−03 | −8.0337100E−04 |
| s12 | 20.99961 | 1.8901300E−02 | −3.7285500E−03 | 5.0550800E−04 | 1.0505400E−05 |

| | A7 | A8 | A9 | A10 | A11 |
|---|---|---|---|---|---|
| s2 | 6.9055700E−05 | −1.3659200E−05 | 1.6554500E−06 | −1.1027800E−07 | 2.6526500E−09 |
| s3 | −3.9043900E−04 | 5.5256200E−05 | −4.6286200E−06 | 2.0409100E−07 | −4.0015400E−09 |
| s4 | −1.0191500E−03 | 1.6213300E−04 | −1.5214200E−05 | 8.1867500E−07 | −2.5103900E−08 |
| s5 | 1.6123800E−03 | −6.2577100E−04 | 1.1352600E−04 | −8.3768500E−06 | 7.2549400E−08 |

TABLE 10-continued

| | | | | | |
|---|---|---|---|---|---|
| s7  | 1.3462200E−02  | −6.1493500E−03 | 1.7412800E−03  | −2.7506200E−04 | 1.8517800E−05  |
| s8  | 5.2836100E−02  | −3.6059400E−02 | 1.4574200E−02  | −3.2292300E−03 | 3.0402900E−04  |
| s9  | −3.2515200E−04 | 1.5611100E−05  | 3.1901300E−06  | 3.4964700E−07  | −1.2370000E−07 |
| s10 | 2.8579400E−04  | −3.2073300E−05 | 3.1386300E−06  | −3.4969000E−07 | 2.6167500E−08  |
| s11 | 7.6617500E−05  | −3.8436000E−06 | 8.6625000E−08  | −1.2386400E−10 | −1.7913200E−11 |
| s12 | −1.9492500E−05 | 2.8567700E−06  | −1.8146900E−07 | 5.4769800E−09  | −6.4501100E−11 |

The refractive power P3 of the third lens L3 is 0.04 and the total focal length f is 11.5, the composite focal length f12 of the first lens L1 and the second lens L2 is 9.26, and the composite focal length f345 of the third lens L3, the fourth lens L4 and the fifth lens L5 is −10.88, and |f12/f345|=0.85. The Abbe number V1 of the first lens L1 is 56.0 and the Abbe number V2 of the second lens L2 is 20.4.

FIG. 16 shows an aberration diagram according to the fifth embodiment of the present invention.

The first data of FIG. 16 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the first embodiment according to the present invention is 0.025 mm or less (focus) and is considered to be good.

The second data of FIG. 16 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the fifth embodiment according to the present invention is 0.025 mm (focus) or less and is considered to be good.

The third data of FIG. 16 shows distortion aberration, where the horizontal axis represents the distortion degree (%) and the vertical axis represents the image height (mm). Generally, it is known to be good if the aberration curve is in the range of −2~2%. Optical distortion, which is the distortion aberration of the fifth embodiment according to the present invention, is judged to be good at 2% or less.

What is claimed is:

1. A telephoto lens system having a plurality of lenses arranged toward a focal object side, the telephoto lens system comprising:
a first lens having a positive refractive power;
a second lens having a negative refractive power;
a third lens having a negative refractive power;
a fourth lens having a negative refractive power; and
a fifth lens having a positive refractive power,
wherein a refractor bending an optical axis is provided between the second lens and the third lens where an angle (A) between the optical axis of the second lens and the optical axis of the third lens satisfies 80°≤A≤86°,
a barrel surrounding the first lens is provided by protruding more toward the focal object side than the first lens, and an inner diameter is smaller than or equal to an effective diameter of the first lens, and
a stop is arranged toward the focal object of the first lens.

2. The telephoto lens system of claim 1, wherein the first lens is convex toward the focal object side, the second lens is convex toward the focal object side and concave toward an image side, and the refractive power (P3) of the third lens satisfies −0.1<P3<0.1.

3. The telephoto lens system of claim 1, wherein an effective focal length (f) of the telephoto lens system satisfies 11≤f≤15, a composite focal length (f12) of the first lens and the second lens satisfies f12>5, and a composite focal length (f345) of the third lens, the fourth lens, and the fifth lens satisfies f345<−5, and 0.5<|f12/f345|<1.5.

4. The telephoto lens system of claim 1, wherein an Abbe number (V1) of the first lens is 50<V1<60, and an Abbe number (V2) of the second lens is 15<V2<30.

5. The telephoto lens system of claim 1, wherein the second lens, the third lens, the fourth lens, and the fifth lens are formed of a plastic material and are aspherical.

6. The telephoto lens system of claim 5, wherein at least one of the third lens, the fourth lens, and the fifth lens has a different Abbe number.

7. The telephoto lens system of claim 1, wherein the effective diameter of the first lens is formed in a circle.

8. A telephoto lens system mounted on a smartphone and having a plurality of lenses arranged toward a focal object side, the telephoto lens system comprising:
a first lens having a positive refractive power;
a second lens having a negative refractive power;
a third lens having a negative refractive power;
a fourth lens having a negative refractive power; and
a fifth lens having a positive refractive power,
wherein the first lens is convex toward the focal object side,
the second lens is convex toward the focal object side and concave toward an image side,
a reflector bending an optical axis is provided between the second lens and the third lens where an angle (A) between the optical axis of the second lens and the optical axis of the third lens satisfies 80°≤A≤86°, and
a barrel surrounding the first lens is provided by protruding more toward the focal object side than the first lens, and an inner diameter is equal to or smaller than an effective diameter of the first lens.

9. The telephoto lens system of claim 8, wherein the refractive power (P3) of the third lens satisfies −0.1<P3<0.1.

10. The telephoto lens system of claim 8, wherein an effective focal length (f) of the telephoto lens system satisfies 11≤f≤15, and a composite focal length (f12) of the first lens and the second lens and a composite focal length (f345) of the third, the fourth and the fifth lenses satisfy f12>5, f345<−5, and 0.5<|f12/f345|<1.5, respectively.

11. The telephoto lens system of claim 8, wherein an Abbe number (V1) of the first lens is 50<V1<60, and an Abbe number (V2) of the second lens is 15<V2<30.

12. The telephoto lens system of claim 8, wherein the second lens, the third lens, the fourth lens, and the fifth lens are formed of a plastic material and are aspherical.

13. The telephoto lens system of claim 12, wherein at least one of the third lens, the fourth lens, and the fifth lens has a different Abbe number.

14. The telephoto lens system of claim 8, wherein the effective diameter of the first lens is formed in a circle.

* * * * *